UNITED STATES PATENT OFFICE.

JAMES WESTHEAD WORSEY, OF ST. HELENS, AND EDWIN HOAL, OF LIVERPOOL, ENGLAND.

EXTRACTION OF GOLD.

No. 846,768.  Specification of Letters Patent.  Patented March 12, 1907.

Application filed June 28, 1904. Serial No. 214,557.

*To all whom it may concern:*

Be it known that we, JAMES WESTHEAD WORSEY and EDWIN HOAL, subjects of the King of England, and residents of St. Helens, in the county of Lancaster, England, and Liverpool, in the county of Lancaster, England, respectively, have invented certain new and useful Improvements in or Connected with the Extraction of Gold from Gold Ores, of which the following is a specification.

This invention has reference to the extraction and separation of gold primarily from refractory gold ores—namely, from certain oxidized deposits of decomposed granite and other like ores admixed with refractory minerals—such, for instance, as arsenic and antimonic acids, magnetite, &c.—which are so combined or mixed with the gold as to make its extraction impossible, at least commercially, by known methods of treatment; but while the invention is more particularly directed to the treatment of such complex or refractory ores its application to the treatment of other gold ores of a less refractory or complex nature and auriferous substances, in connection with which it can be usefully and advantageously employed, is embraced hereunder.

According to this invention the ore having first been reduced and screened and freed as much as possible from aluminium silicates in any known way, is treated with or subjected to the action of nascent bromid of chlorin produced in the body and presence of the ore by mixing with the powdered or crushed ore a salt of chlorate of soda and bromid of soda or a chlorate and bromid of other equivalent alkali or a chlorid and bromid of an alkaline earth, the quantity needful for the effectual extraction of the gold varying with the richness of the ore in that metal which must be determined by actual assay. The mixture is quietly stirred or mixed during the operation. There is added to this composition of admixed ore and chemicals some acid, as hydrochloric, sulfuric, or other suitable acid, according to the chemical salts selected and used for the formation of this bromid of chlorin only in such suitable quantities and of dilute strengths as will not cause a too rapid reaction of the chemicals. Otherwise the most valuable part of the selective reagent will be wasted and the extraction low in gold. The material may also be gently stirred at this period. Under this condition the reaction will begin directly, and as it proceeds the temperature of the substance or material or mass should be regulated—that is, raised from time to time till it rises to about 150° Fahrenheit.

When the mass or material has been under treatment under the above conditions for, say, about four hours, the temperature may be raised to near boiling-point for the purpose of completing the dissolving of the gold, and finally to free it from excess of gaseous products. At this stage the complex minerals are completely broken up and the gold dissolved. The whole is now allowed to settle, and the clear solution is decanted away, while the residue is well washed with hot water to extract from it all soluble gold, and this solution, together with the decanted solution, are mixed in a vat prepared for them and are treated with a sufficient quantity of a solution of an alkali or an alkaline earth, whereby any acid present is neutralized, care being taken that the neutralization is properly effected. A weak solution of a lead salt is now added to the gold solution (the quantity of lead salt added depending upon the gold contained in the solution) and the whole vigorously stirred, with the effect that the gold contained in the solution is taken up by the lead salts. Sulfid of hydrogen ($H_2S$) or other suitable known equivalent acid, either as gas or in solution, is added to the whole until it turns quite black, and it should be again well stirred or agitated by blowing through it a quantity of atmospheric air for some minutes—say about ten to twenty minutes. In this condition the precipitated gold and lead sulfid will settle out completely, and they can be collected, dried, and calcined carefully in a muffle-furnace and afterward melted with the addition of some lead in any suitable form in a smelting-furnace and the metallic lead product refined in the bone-ash test in the well-known manner for the recovery of fine gold.

To recover any residual gold contained in the ore previously separated from the gold solution, it is treated and washed in a vat with a weak solution of double or single ferroprussiate of ammonium and commercial soda carbonate after the manner of ordinary leaching. The effect of this is that all the residuary gold in the ore is dissolved out of it, and this is effected quickly—namely, within twenty-four hours. The gold is dissolved out in the first stage as bromo chlorid, and afterward when heated it resolves itself into "auric chlorid," Au Cl$_3$. In this treatment the ferro-prussiate of ammonium acts as an expeditor or saver of time, and by it the residual ores of this and other gold-extraction processes can be economically treated and gold extracted and within a greatly-reduced time. The solution resulting from this leaching operation can be treated like the previous solution (after neutralization) with the lead-salt solution and sulfid of hydrogen (H$_2$S) for the separation of the auriferous lead sulfid, which may be smelted and refined in the same manner and by the same treatment as above described.

In the case of the application of the invention to the extracting of gold from rich concentrates it may be desirable and necessary to adopt more prolonged and careful operations and treatment.

Having now particularly described our invention, what we claim as new, and desire to secure by Letters Patent, is—

1. The process of extracting gold from gold ores, by treating such gold ores to the action of nascent bromid of chlorin produced by the admixture of a salt of chlorate of an alkaline substance, and bromid of an alkaline substance, and a suitable acid in the presence of the ore; substantially as and for the purposes set forth.

2. The process of extracting gold from gold ores, by treating such gold ores to the action of nascent bromid of chlorin produced by the admixture of a salt of chlorate of an alkaline substance, and bromid of an alkaline substance, and a suitable acid in the presence of the ore, and subjecting same to a gentle heat; and subsequently raising the temperature of the mixture; substantially as and for the purposes as herein set forth.

3. The process of extracting gold from gold ores, by treating such gold ores to the action of nascent bromid of chlorin produced by the admixture of a salt of chlorate of an alkaline substance, and bromid of an alkaline substance subjecting same to heat; then separating the gold solution from the undissolved portion; then treating the gold solution with a weak solution of a lead salt added to it, and agitating same; and then subsequently treating it with acid, added to it, and subsequently agitating same, preferably by forcing air through it; substantially as set forth.

In witness whereof we have hereunto set our hands in presence of two witnesses.

JAMES WESTHEAD WORSEY.
EDWIN HOAL.

Witnesses:
ARTHUR MCDONALL HANNAY,
ROGER BEYNON.